Nov. 3, 1942.  S. W. BORDEN  2,300,771

FAULT LOCATING EQUIPMENT

Filed Aug. 16, 1940

Inventor
Stephen W. Borden

Patented Nov. 3, 1942

2,300,771

UNITED STATES PATENT OFFICE 2,300,771

FAULT LOCATING EQUIPMENT

Stephen W. Borden, Summit, N. J.

Application August 16, 1940, Serial No. 352,940

3 Claims. (Cl. 175—183)

This invention relates to methods and means for locating faults in insulated electrical conductors and particularly by the well-known method of sending a tracer current through the conductor and thence through the fault to ground and then following the tracer current along the conductor by means of a suitable pick-up device or tracer current detector.

In making such tests a great deal of difficulty has always been experienced because of charging current which flows in and out of the conductor whenever the potential is applied for causing a flow of tracer current and this charging current is to be found along the entire length of the cable and may as a rule be heard in the detector device, even when the detector is placed beyond the fault, which naturally results in confusion and interferes seriously with definitely locating the point of fault.

I have designed equipment for producing tracer current of a novel character which in operation greatly reduces the interference from charging current and I have developed a method of making such tests whereby the effect of the charging current may be practically eliminated.

Figure 1:
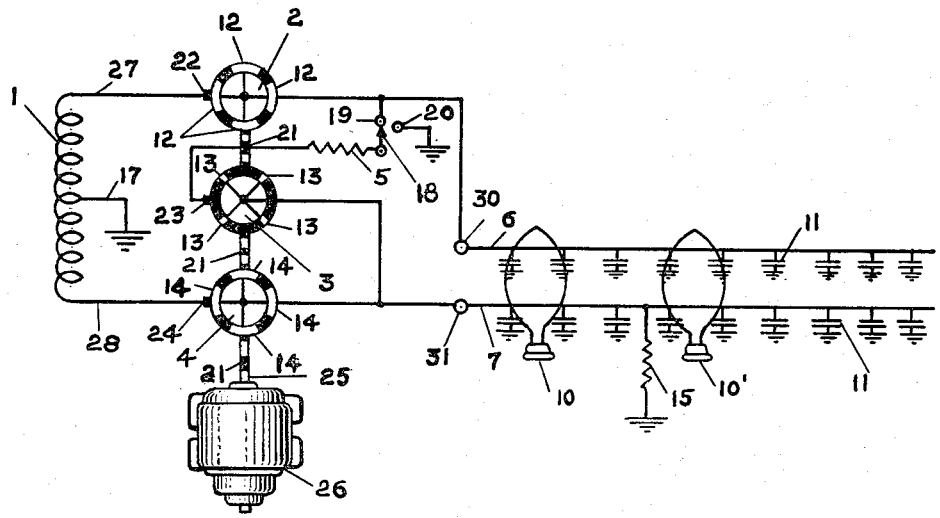
Figure 2:
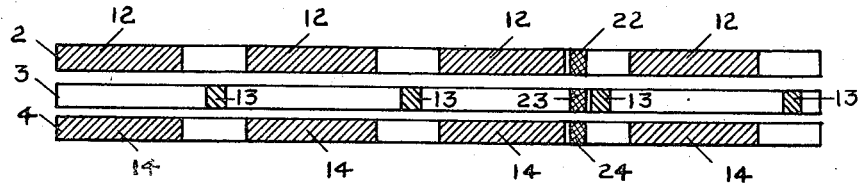

Referring to the drawing, Fig. 1 is a schematic representation of a motor-driven circuit-interrupting commutator device for producing tracer current and showing circuits connected to this source of current for testing purposes. Fig. 2 shows the relative position of the conducting members of the three commutators with respect to each other and with respect to the contact brushes.

Referring now to the drawing: 2, 3 and 4 are commutators of conventional type mounted upon a common shaft which is driven by motor 26. The three commutators are insulated from each other and from the motor as indicated by the insulating portions of the shaft 21. The commutator 2 consists of four metallic segments each designated by the numeral 12 and all of which are connected together and, via a slip ring and brush not shown, to binding post 30. Brush 22 rides on the commutator and is connected to the source 1 by lead 27. The commutator 4 consists of four metallic segments each designated by the numeral 14 which are all connected together and connected, via a slip ring and brush not shown, to binding post 31. Brush 24 rides on the commutator and is connected to the source 1 by lead 28. The commutator 3 contains four conducting segments indicated by the numeral 13 all of which are connected together and connected, via a slip ring and brush not shown, to binding post 31. A brush 23 rides on the commutator 3 and is connected, via a discharge resistor 5, to a single pole double throw switch 18 by means of which it may be connected either to binding post 30 or to ground. By referring to Fig. 2 it will be seen that when the brushes 22 and 24 are in contact with the metal segments of commutators 2 and 4 a circuit is established through commutator 2 to conductor 30 and through commutator 4 to conductor 31 and that during this period of contact the brush 23 is out of contact with the metal segments 13 and it will be seen that a connection is maintained through commutator 3 only during the period that there is no connection through commutator 2 or 4.

A suitable source of testing current as 1, which has a grounded mid-potential point as 17, is connected via a conductor 27 with brush 22 and via a conductor 28 with brush 24. The potential between conductors 27 and 28 is double the potential between each of these conductors and the mid-potential point constituting a conventional "three-wire" source of supply when the mid-point is grounded.

6 and 7 represent two similar conductors within a single cable or close together, the conductors having equal capacities to ground which capacity is represented by the condensers 11 distributed along the entire length of each conductor. Conductor 7 has developed a fault to ground, 15. 10 and 10' represent any conventional form of detector device for detecting the presence of a tracer current in conductor 7.

In operation the defective conductor 7 is connected to binding post 31 and if there be available an ungrounded companion conductor as 6 it is connected to binding post 30. The commutators are then put in motion and a detector device 10 is applied to the cable and the tracer current followed out from binding post 31 to the fault 15. When the potential is applied to posts 30 and 31 a charging current will flow into cables 6 and 7, the magnitude of which is obviously at a maximum at the binding posts and decreasing towards the ends of the conductors. When the commutators 2 and 4 break circuit the conductors 6 and 7 remain charged and the potential between the conductors and ground depends upon the potential existing at the moment when the circuit is opened or in other words it may be the peak value of an alternating current wave in case source 1 is ordinary alternating current which is often the case. As soon as commutators 2 and 4 have broken the circuit commutator 3 short-circuits conductors 6 and 7 and thereby discharges the conductors reducing them to earth potential. Commutators 2 and 4 then again close the circuit and the cycle is repeated.

In the case where the ground 15 is of relatively low resistance it is necessary to apply between conductor 7 and ground only a relatively low voltage and under such circumstances the difficulties from charging current are not very serious, but often the fault resistance is very high and it becomes necessary to apply a relatively high voltage in order to force through the fault 15 a tracer current sufficiently large to properly operate the detector 10 and under such conditions, and where the conductor itself has a substantial amount of capacity to ground, two difficulties are presented.

The first difficulty is due to the charging current. Assuming for the moment that conductor 6 is not utilized and that switch 18 is connected to contact 20 and thence to ground. The tracer current flows from binding post 31 through conductor 7 to the fault 15 and thence through the fault and through the ground back to 17 but the charging current for conductor 7 flows from binding post 31 along the entire length of the cable and as a result it will be heard in the detector even when the detector is beyond fault 15 as indicated at 10'. If the circuit is broken by commutator 4 at the instant when the voltage between conductor 7 and ground is at a maximum, as for instance at the peak of an alternating current wave, and if it were to remain in that condition until the circuit were again closed and if upon reclosing the potential happened to be again at peak value but in the opposite direction then the voltage effective for producing a flow of charging current would be twice the normal voltage and the effects of the charging current would be doubled, but by discharging the conductor each time that the circuit is opened, as by means of commutator 3 and discharge resistance 5, it is possible to limit the maximum voltage to ground and therefore the maximum charging current to that which can be produced by the maximum potential of the energy source 1 itself, which arrangement reduces considerably the troublesome effects of charging current. However, where conditions are particularly severe a still further reduction of charging current interference is very desirable and where an ungrounded companion conductor, as 6, is available this conductor is connected to binding post 30 and switch 18 is placed on contact 19 and now the charging current in the two cables 6 and 7 will be substantially equal and opposite in direction, and will not affect the detector 10, regardless of the location of detector 10 along the cable or with respect to fault 15, providing the discharge resistor 5 is of relatively low resistance as compared to the resistance of the fault 15.

It has been pointed out that without a discharging device, as 3, conductor 7 is almost certain to be subjected momentarily and at frequent intervals throughout a test, to a voltage to ground which may be as great as two times the peak voltage of the source of tracer current. Assume, for instance, that conductor 7 is one to which an alternating current of 2500 volts may be safely applied but to which it is not safe to apply a higher voltage, then without some means of preventing the voltage building up to double values it would not be safe to apply more than 1250 volts alternating current between the conductor and ground, which in turn means that the maximum value of fault resistance through which an adequate tracer current might be forced would be reduced to one-half the value which would obtain when a discharge device is used. It will be noted that this protection against double voltage applies whether the conductor 7 be an isolated conductor with no companion conductor and is being tested as such or whether it is being tested in connection with a companion conductor as shown in the drawing.

It will be seen that the discharging device is useful both for limiting the voltage between conductor and ground and for limiting the magnitude of the charging current and this regardless of whether the two-wire or three-wire method is being used for locating the fault and it is true also that the three-wire method for locating the fault is so effective, so far as eliminating interference from charging current is concerned, that the discharging device is not necessary for eliminating charging current disturbance in device 10 but it still remains useful for the purpose of limiting excessive potential between the conductor and ground and also for reducing the maximum charging current which the interrupter contacts have to handle.

With respect to discharge resistor 5 I have found that for testing conductors which have a capacity to ground as high as 5 microfarad and with an applied voltage as high as 2500 volts this resistor may have a value of approximately 400 ohms and 60 watts. Of course, this resistor may be omitted entirely, brush 23 being connected directly to switch 18, but when that is done the sparking at brush 23 will be severe and in fact quite explosive under the test conditions just mentioned and it may be pointed out also that without any discharging device the sparking condition at brushes 23 and 24 will be severe and at those times when the voltage is built up on conductor 7 to nearly double, the discharge may be highly explosive as is the case, for instance, when a 5 microfarad condenser, charged to a potential of 5000 volts, is discharged through a low resistance.

The equipment and the method of testing described are intended primarily for use in connection with high voltage and large capacity underground light and power cables. These cables often have very large capacity to ground and defects are sometimes of high resistance and in order to obtain a tracer current of sufficient magnitude the tracer current equipment must be capable of handling often as much as 10 to 15 kilowatts of energy and any interrupting devices in the circuit must be capable of interrupting that energy and often at voltages of 5000 or 10,000 volts. Usually the only initial source of power will be a 60 cycle power circuit, but telephone receivers are not at all sensitive to 60 cycle current and there is usually much stray 60 cycle current to be contended with. However, the telephone receiver is very rugged, very inexpensive, light and small and extremely sensitive to higher frequencies such as say 600 cycles per second and it has, therefore, been the practice to interrupt a 60 cycle supply circuit at a frequency to which the telephone receiver would be highly responsive and also to provide a tracer current which may be easily distinguished from stray 60 cycle current. It should be noted, however, that the only essential requirements are that the pick-up device be of such character that it will respond with sufficient sensitivity to the tracer current and there are some combinations of tracer current and pick-up devices which do not involve the use of commutators or interrupters. For instance, the source 1 might itself be of a frequency to which the telephone receiver would have high responsive sensitivity, and no interrupter would be necessary, but with such frequencies it becomes imperative that some provision be made for compensating for the charging current and a method of making such compensation is, as previously stated, one of the objects of this invention. It will be apparent that swing current generator equipment may be substituted for source 1 and the commutators, providing detector 10 includes a swing current meter responsive to the tracer swing current (see U. S. Patent No. 2,176,755).

What I claim is:

1. The method of supplying tracer current to a conductor for locating a fault along said conductor which includes: periodically connecting to and disconnecting from the faulty conductor a source of potential to ground and simultaneously applying to a similar but ungrounded conductor located within the same cable as the defective conductor, a potential to ground which is at all times equal, but of opposite polarity, to the potential to ground applied to the defective conductor, and discharging the electrostatic capacity of the conductors during each period that the conductors are disconnected from the source of current.

2. Equipment for locating a fault in a conductor by means of a tracer current which includes: a source of current having a mid-potential tap for connection to ground and two end terminals, one for connection to the defective conductor and the other for connection to a companion non-defective conductor, the two terminals having a potential difference equal to twice the potential difference between either terminal and ground, means for periodically and simultaneously interrupting the flow of current from both end terminals and for connecting the two conductors together during part of the period when the current flow is interrupted.

3. Equipment for locating a fault in a conductor by means of tracer current which includes: a source of current having a first terminal connected to ground, a second terminal for connection to the faulted conductor and a third terminal for connection to a companion non-defective conductor, the potential between the first and second terminals being equal to that between the first and third terminals but of opposite polarity, means for periodically and simultaneously opening and closing connections between the second and third terminals and the conductors and for connecting the two conductors together during part of the period when the conductors are disconnected from the terminals.

STEPHEN W. BORDEN.